United States Patent [19]

Matsuda et al.

[11] 4,108,376
[45] Aug. 22, 1978

[54] HEATER UNIT FOR AIR-CONDITIONER IN AUTOMOBILE VEHICLE

[75] Inventors: Tamotsu Matsuda, Wako; Hiroshi Kuroda, Kamifukuoka, both of Japan

[73] Assignee: Honda Giken Kogyo Kabushiki Kaisha, Japan

[21] Appl. No.: 820,561

[22] Filed: Aug. 1, 1977

Related U.S. Application Data

[63] Continuation of Ser. No. 679,576, Apr. 23, 1976, abandoned.

[30] Foreign Application Priority Data

Apr. 30, 1975 [JP] Japan .................................. 50-59181

[51] Int. Cl.² .............................................. B60H 1/02
[52] U.S. Cl. ............................ 237/12.3 A; 237/12.38; 98/2.08
[58] Field of Search ...................... 237/12.3 A, 12.3 B, 237/12.3 R; 98/2.05, 38 A, 38 R, 38 Z, 2.06, 2.08; 165/35, 103

[56] References Cited

U.S. PATENT DOCUMENTS

| 2,718,839 | 9/1955 | Wilfert | 237/12.3 B |
|---|---|---|---|
| 3,646,875 | 3/1972 | Zenkner | 98/2.08 |
| 3,807,631 | 4/1974 | Mohr | 237/12.3 A |
| 3,913,834 | 10/1975 | Supper | 237/12.3 A |

FOREIGN PATENT DOCUMENTS

| 705,572 | 3/1954 | United Kingdom | 237/12.3 A |
|---|---|---|---|
| 1,073,077 | 6/1967 | United Kingdom | 237/12.3 A |

Primary Examiner—John J. Camby
Assistant Examiner—Henry C. Yuen
Attorney, Agent, or Firm—Polster, Polster and Lucchesi

[57] ABSTRACT

A heater unit for air conditioner in automotive vehicles of a construction, wherein external cool air introduced into the heater unit is led into a first bypass, through which it is directed to the upper part of the vehicle cabin, while the cool air current is distributed by a first damper to both heat exchanger and first bypass in an adjustable manner so as to effect warming and/or cooling operation, in which warm air current discharged from the heat exchanger is intermingled with the cool air current in the first bypass to prevent the air current from becoming excessively heated, and the thus intermingled warm and cool air currents at their merging point is appropriately distributed by a second damper provided in the neighborhood of the merging point so as to maintain adequate temperature difference between the upper and lower ports of the vehicle cabin; a second bypass is further provided to communicatively connect a space at the entrance side of the heat exchanger to let the cool air current in with a space at the discharging side thereof to let the warm air current out, and a damper is provided in the second bypass to control, flow rate of the air current in the second bypass.

2 Claims, 5 Drawing Figures

4,108,376

HEATER UNIT FOR AIR-CONDITIONER IN AUTOMOBILE VEHICLE

This is a continuation, of application Ser. No. 679,576 filed Apr. 23, 1976, now abandoned.

BACKGROUND OF THE INVENTION

This invention relates to a heater unit which is adapted to an air-conditioning device in automotive vehicles.

There have so far been known the heater unit of a construction such that, with a view to attaining the head-cooling-feet-warming mode, cool air current which has passed through an evaporator is introduced into an inlet or suction opening of the heater unit, and the thus introduced cool air current is divisively distributed by a distributing damper provided within the heater unit so that cool air, as it is may be discharged upwardly into the vehicle compartment or cabin through an upwardly directing outlet opening, while warm air obtained by causing a portion of the introduced cool air current to pass through a heat exchanger within the heater unit may be discharged downwardly into the vehicle cabin through a downwardly directing outlet opening.

In the heater unit of the above-described type, since major portion of warm air current which has passed through the heat exchanger is discharged almost directly downward of the vehicle cabin, for example, to the defroster, or to the feet of the riders, there inevitably occurs such phenomenon that the temperature only at the lower part of the vehicle cabin rapidly increases to cause excessive temperature difference between the upper and lower parts in the vehicle cabin, which has been the problem in controlling the temperature for its appropriate and uniform distribution. Further, there is such inconvenience that, when a trouble occurs in the heater unit at the time of the cooling operation, the cool air current becomes unavoidably heated.

SUMMARY OF THE INVENTION

It is therefore an object of the present invention to provide a heater unit for air-conditioner in the automotive vehicles which is capable of solving the above-described various problems inherent in the known devices, of effecting gradual temperature rise in the lower part of the vehicle cabin, and of maintaining the temperature distribution in the vehicle cabin in an agreeable mode of head-cooling-feet-warming.

It is another object of the present invention to provide a heater unit for an air-conditioner in the vehicle which is capable of preventing cool air current from being heated, even when trouble occurs with the heater unit during the cooling operation.

The foregoing objects, other objects, as well as specific construction and operations of the device according to the present invention will become more apparent from the following detailed description thereof, when read in conjunction with the accompanying drawing.

BRIEF DESCRIPTION OF THE DRAWING

In the drawing:

Referring now to FIG. 1, the air-conditioning device for automotive vehicles generally comprises a housing 1 to accommodate therein various air-conditioning units, an inlet opening 2 for external air, an inlet opening 3 for internal air within the vehicle cabin, an outlet opening 4 for directing air upward of the vehicle cabin, and an outlet opening 5 for directing air downward of the vehicle cabin. Within the housing, there are further provided a change-over damper 6, a blower 7, an evaporator 8, and a heater unit 9.

FIGS. 2 and 3 illustrates detailed construction of the heater unit 9 to be installed in the above-described air conditioning device. As shown in the drawing, this heater unit is constructed with a unit housing 10, at one side surface part of which there is formed an inlet opening 11 for taking into the unit housing cool air current which has passed through the evaporator 8, a first damper 12 disposed in the direction perpendicular to the inlet opening 11, which functions to distribute the cool air current to enter into the unit housing through the inlet opening 11 to a first bypass 13 communicating to the upwardly directing outlet opening 4, and to a heat exchanger 14 disposed therebeneath. The first damper 12 is so constructed that it may close an entrance 27 to the first bypass 13 at the time of the maximum warming operation, and may close the entrance 15 for the cool air current to proceed into the heat exchange at the time of the cooling operation. A guide passageway 16 for warm air current is provided at the downstream side of the heat exchanger 14. The passageway 16 is of such a configuration that the warm air current which has been discharged downwardly from the heat exchanger 14 may be turned to flow in the upward direction so as to be merged into the cool air current in the first bypass 13 at the substantially vertical angle (including, of course, a slight inclination) with respect thereto. There is also provided through a partition wall 17 a downwardly directing outlet passageway or duct 18 in substantially parallel with the warm air current guide passageway 16. A second damper 19 is provided at the entrance of the downwardly directing outlet passageway 18, i.e., in the vicinity of the merging point of both warm and cool air currents, so as to distrubute major portion of the cool air current to the upwardly directing outlet opening 4 in the vehicle cabin and major portion of the warm air current to the downwardly directing outlet opening 5, for example, an outlet opening to the defroster 20 and an outlet opening 21 to the feet of the riders. This second damper 19 is in an interlocked relationship with the abovementioned first damper 12 and closes the entrance to the downwardly directing outlet passageway 18 at the time of the cooling operation. Within the downwardly directing passageway 18, there is provided a damper 21a which controls the warm air current directing to the outlet opening 20 to the defroster and the outlet opening 21 to the riders' feet. The abovementioned dampers 12, 19 and 21a can be controlled their amount opening either manually or automatically with the respective shafts 22, 23, and 24 as the center of oscillation.

Figure 1:
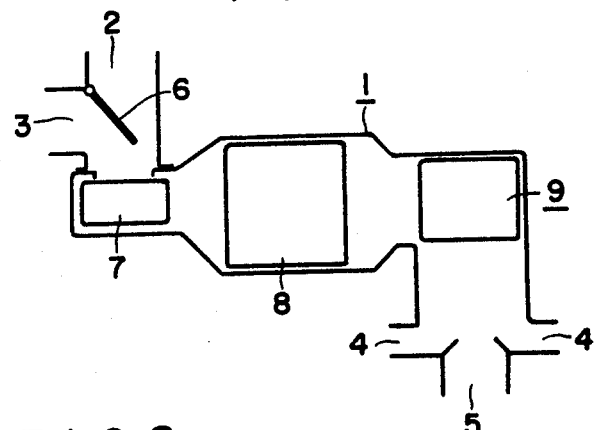
FIG. 1 is a schematic diagram showing the general layout of an air conditioning device for automotive vehicles.
Figure 2:
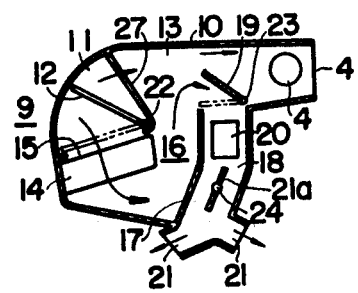
FIG. 2 is a side elevational view in cross-section showing the heater unit according to the present invention, which is to be incorporated in the air conditioning device.
Figure 3:
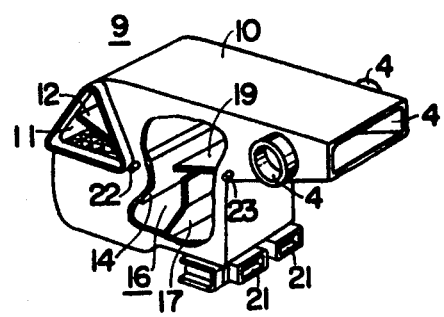
FIG. 3 is a perspective view, partly being cut away, of the heater unit shown in FIG. 2.

Since the present invention has been constructed as mentioned above, the cool air current from the inlet opening 11 is divided by the first damper 12 into a portion directing to the first bypass 13 defined above the damper, and another portion directing to the heat exchanger 14 disposed below the damper. The warm air current discharged downwardly from the heat exchanger 14 is then turned its direction of proceeding upward along and through the guide passageway 16 with the result that, even if the air is heated unevenly, it can be mixed sufficiently uniformly during its passage through the guide passageway 16 to have uniform temperature therethroughout and merges with the cool air current in the first bypass 13 in the upper part thereof from lower part at a substantially vertical angle with respect thereto. At this merging point, the warm air current is in a state of being suppressed by the cool air current thereabove, so that both warm and cool air currents are separated in substantially two layers, and major portion of the warm air current of the lower layer is immediately introduced into the downwardly directing outlet passageway 18 by the second damper 19, while being accompanied by a portion of the cool air current of the upper layer and being mixed therewith, and then discharged into the vehicle cabin through the respective outlet openings 20 and 21.

Accordingly, the warm air current at the time of its discharge is sufficiently mixed and maintained at a uniform temperature level. Moreover, since it is mixed with a portion of the cool air current, there is no apprehension of the air temperature to rise excessively. On the other hand, the cool air current within the first bypass 13 is discharged into the vehicle cabin through the upwardly directing outlet opening 4, while being accompanied by a portion of the warm air current of the lower layer and being mixed therewith, so that there is no apprehension of the air temperature being excessively low. Owing to such arrangement, the temperature difference in both upper and lower parts of the vehicle cabin is prevented from becoming diverged widely, whereby comfortable temperature distribution can be maintained in the vehicle cabin.

Furthermore, at the time of the cooling operation, the cool air current entrance 15 of the heat exchanger 14 is closed by the first distributing damper 12, so that, even when a warm water valve is opened by mistake and the heat exchanger 14 is brought to an operative state, heating of the cool air current can be prevented to the minimum possible extent, because the cool air current simply passes over the damper 12. Furthermore, since temperature adjustment of the discharging warm air current, its distribution into the upper and lower directions, and setting of the temperature difference between the upper and the lower parts of the vehicle cabin can be carried out by the two dampers 12 and 19, interconnection of these dampers with a control system is relatively easy.

Figure 4:
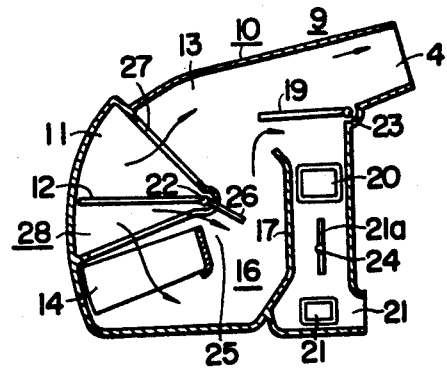
FIG. 4 is a side elevational view in cross-section showing another embodiment of the heater unit according to the present invention.

FIG. 4 indicates another embodiment of the heater unit according to the present invention, wherein a second bypass 25 is provided at one side of the heat exchanger 14 so that a space 28 at the entrance side of the cool air current into the heat exchanger 14 may be communicated with a space at the discharging side of the warm air current therefrom, i.e., the warm air current guide passageway 16. A damper 26 for controlling the flow rate of the air current is provided in the second bypass 25. In the illustrated embodiment, the damper 26 is formed integrally with the first damper 12 in such a construction that, when the maximum warming operation is to be effected, the first damper 12 oscillates in the clockwise direction with the shaft 22 as the center of its oscillation to close the entrance 27 to the first bypass 13, whereupon the damper 26 closes the second bypass 25.

In the above-described construction, the cool air current which has entered into the heater unit is distributed by the first damper 12 to both upwardly directing outlet opening 4 and heat exchanger 14 down below the first damper. And, major portion of the cool air current flowing toward the heat exchanger 14 is introduced into the heat exchanger 14, and a part of the cool air current, the flow rate of which has been controlled by the flow rate controlling damper 26 passes through the bypass 25. The cool air current from the bypass 25 is merged and mixed with the warm air current from the heat exchanger 14 at the lower part of the housing to reduce the temperature of the warm air current to an appropriate level. The warm air current at the appropriately controlled temperature ascends along the partition wall 17 of the heater housing, major portion of which is introduced into the downwardly directing outlet openings (riders' feet and defroster) 20 and 21 by the damper 19 accompanied by a part of the cool air current, and the remaining part of which is introduced into the upwardly directing outlet opening 4, while being mixed with the cool air current from the inlet opening 11.

Accordingly, in the above-described heater unit according to the present invention, temperature of the warm air current from the downwardly directing outlet opening does not increase rapidly due to the function of the second bypass 25. Also, in the above-described embodiment, since a part of the warm air current is mixed with the cool air current flowing toward the upwardly directing outlet opening, the temperature difference in the upper and lower parts of the vehicle cabin can be made gradually widened in accordance with the temperature increase without it being made wider to any extreme degree, whereby the temperature distribution within the vehicle cabin can be maintained at an adequate level.

Figure 5:
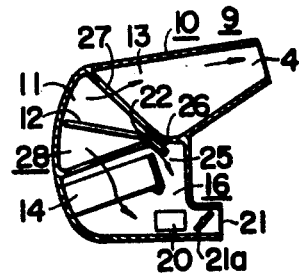
FIG. 5 is also a side elevational view in cross-section showing a further embodiment of the heater unit according to the present invention.

The modified embodiment shown in FIG. 5 is so constructed that the mixed warm air current which has passed through the heat exchanger 14 and the second bypass 25 is directly introduced into the downwardly directing outlet opening, whereby unnecessary temperature increase in the downwardly directing warm air current can be restrained due to the function of the second bypass 25 same as in the above-described embodiment in FIG. 4. Incidentally, the flow rate controlling damper 26 of the second bypass 25, besides it is interlocked with the first damper 12, may also be interlocked with the second damper 19, or may be controlled independently of other dampers.

While the present invention has been described with reference to the particular embodiments thereof, it should be noted that the invention is not limited to these embodiments alone, but any change and modification may further be made by those skilled in the art within the spirit and scope of the invention as set forth in the appended claims.

What is claimed is:

1. A heater unit for air-conditioner in automotive vehicles which comprises, in combination:

(a) a heat exchanger to warm external cool air introduced into the heater unit through a fresh air inlet opening;

(b) a first bypass provided above said heat exchanger, and to lead the cool air current introduced into the heater unit to the upper part of the vehicle cabin;

(c) a first damper for distributing the cool air current introduced into said heater unit to both said heat exchanger and said first bypass, said first bypass being closed at the time of the maximum warming operation and an entrance to said heat exchanger being closed at the time of the cooling operation by said first damper;

(d) a guide passageway to introduce warm air current which is discharged from said heat exchanger into the cool air current in said first bypass from below at a substantially vertical angle;

(e) a downwardly directing passageway extending from the vicinity of a merging point of said both warm and cool air currents to a plurality of downwardly directing outlet openings in the vehicle cabin in substantially parallel with said guide passageway through a partition wall;

(f) a second damper provided in the vicinity of the merging point of said both warm and cool air currents, and to distribute a major portion of the cool air current through said first bypass to a plurality of upwardly directing current, and a major portion of the warm air current through said downwardly directing passageway to the downwardly directing outlet openings in the vehicle cabin along with a portion of the cool air current;

(g) a second bypass provided at one side of said heat exchanger, and to lead a portion of the cool air current distributed to said heat exchanger by said first damper to the discharging side of said heat exchanger; and (h) a third damper provided in said second bypass, said third damper being formed integrally with said first damper so as to control the flow rate of the air current through said second bypass corresponding to the position of said first damper.

2. The heater unit as claimed in claim 1, wherein said first damper is a vane-type damper and said fresh air inlet opening of said heater unit is positioned at one end of said vane-type first damper, so that said damper acts as a divider forming, in an intermediate position, a pair of pipes or conduits for introducing the fresh air effectively separated from one another.

* * * * *

UNITED STATES PATENT AND TRADEMARK OFFICE
CERTIFICATE OF CORRECTION

PATENT NO. : 4,108,376
DATED : August 22, 1978
INVENTOR(S) : Tamotsu Matsuda and Hiroshi Kuroda It is certified that error appears in the above-identified patent and that said Letters Patent are hereby corrected as shown below:

Claim 1, column 6, line 3, after "directing" insert --- outlet openings in the vehicle cabin along with a portion of the warm air ---.

Signed and Sealed this

Sixth Day of March 1979

[SEAL]

Attest:

RUTH C. MASON
Attesting Officer

DONALD W. BANNER
Commissioner of Patents and Trademarks